Aug. 22, 1967  E. H. WILLETTS  3,337,235
HELICAL TORSION SPRING VEHICLE SUSPENSION
Filed Sept. 23, 1965  2 Sheets-Sheet 1
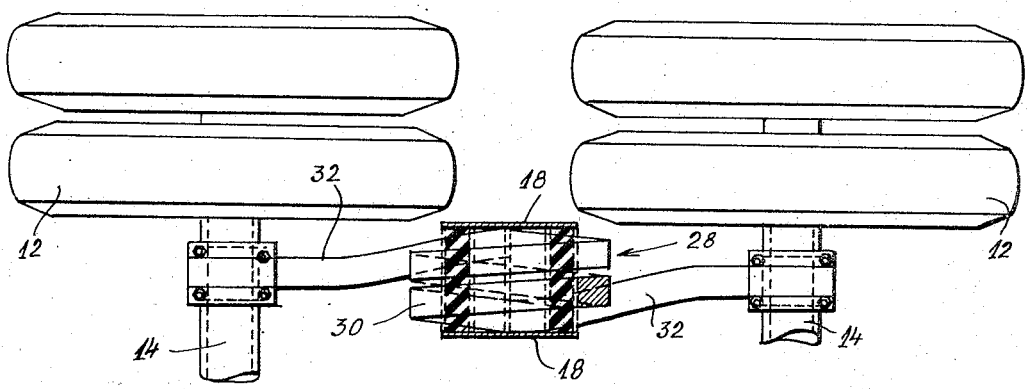
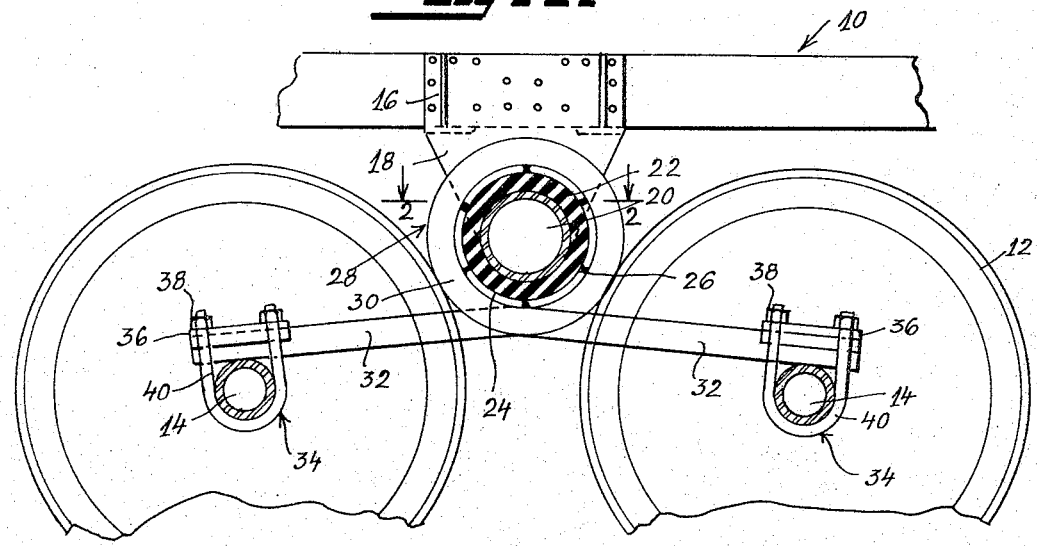
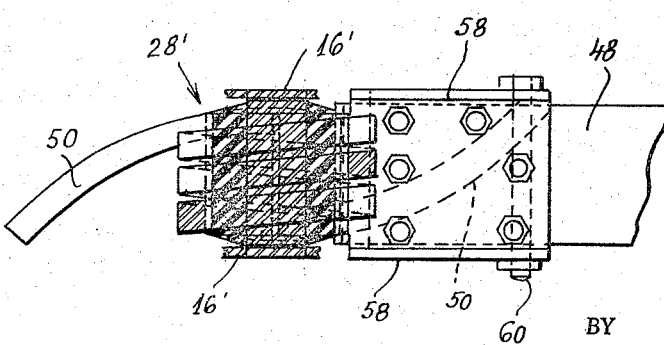
INVENTOR
Elwood H. Willetts
BY
Potachek & Saulsbury
ATTORNEYS

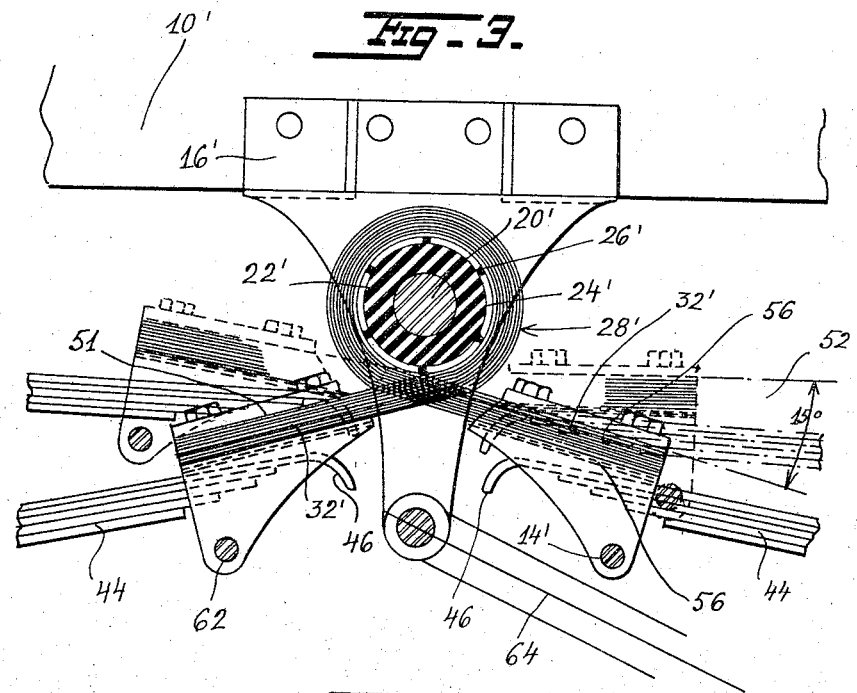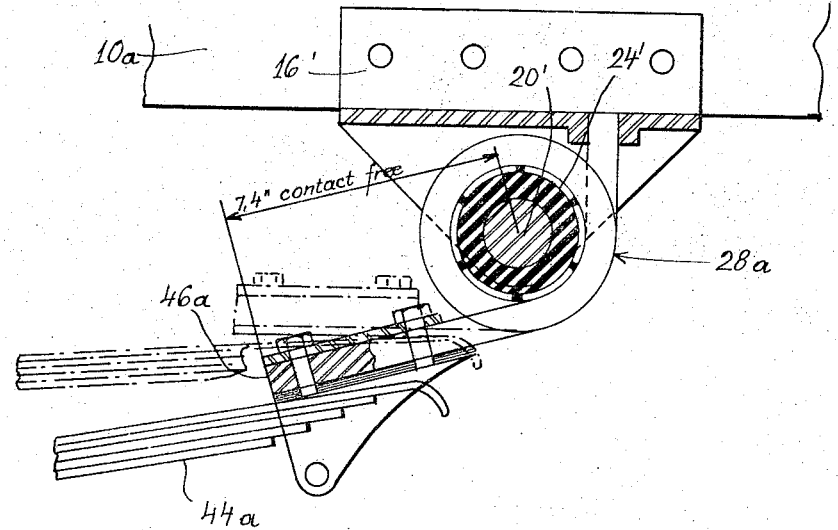

United States Patent Office 3,337,235
Patented Aug. 22, 1967

3,337,235
HELICAL TORSION SPRING VEHICLE
SUSPENSION
Elwood H. Willetts, Douglaston, N.Y.
(102 S. Penataquit Ave., Bay Shore, N.Y. 11706)
Filed Sept. 23, 1965, Ser. No. 489,503
2 Claims. (Cl. 280—104.5)

This invention relates to the application of helical torsion springs to isolate the excitations of each axle from its opposing mate and to isolate the vehicle structure (airplane, railcar or land vehicle) from the roadway shocks and axle vibrations of both axles of a tandem suspension for air, rail and ground contact vehicle. This invention is an improvement of over the disclosure of my copending application for Letters Patent, Ser. No. 446,-632, filed Apr. 8, 1965.

According to one form of the invention, helically wound torsion springs are hingedly attached to the vehicle structure between the tandem axles and extend directly to both supporting axles. In this form of the invention, the torsion springs serve as equalizing, torque reactive, articulated suspension beams adjustably secured to each axle, whether of the stub axle type with a load bearing wheel on either side thereof, or the conventional cross axles commonly used in trucks, trailers and rail cars.

According to a modified form of the invention, helical torsion springs serve as equalizing, torque reactive beams to interconnect the adjacent ends of leaf springs secured to each axle of a tandem bogie, to isolate the excitations of each axle from its mate and from the vehicle structure to which said helical torsion springs are pivotally bracketed.

In a further modified form of the invention, helical torsion springs serve as isolators between the ends of leaf springs and a vehicle structure.

In each form of the invention, a load proportioned tubular elastomer bushing is employed, within the coil as a trunnion bearing in its attachment to the vehicle structure, whereby said elastomer bushing is contracted, on its outer diameter by the helically coiled torsion spring as its inner diameter is reduced by the load imposed thereon.

Currently-used suspensions for tandem bogies are generally of two types. In one type, both axles are interconnected by a beam pivoted on supporting springs attached to the vehicle structure, and in the other type a semi-elliptic spring is affixed to each transverse end of each axle, with the outwardly extending spring ends attached directly to the vehicle structure, and the inwardly extending (thus adjacent) spring ends supporting an equalizing beam pivoted to the vehicle structure, and with supplemental radius rods for adjustable alignment each axle with the vehicle structure.

The weakness of such constructions lie in the transmission, rather than the isolation, of road shocks and axle vibrations from one axle to its opposing mate, through the interconnecting non-resilient beam which equalizes the load between the two axles to which it is directly connected, or between the adjacent spring ends, inducing wheel hop, and at certain speeds, on perfectly smooth roads, this transmission of axle excitations further induces destructive harmonics in such rigid vehicle structures as tankers, skinstressed box bodies, etc.

A principal object of this invention is to provide an integrally articulated and torque reactive suspension beam pivotally interconnecting a vehicle structure and its tandem supporting axles, whereby road shocks and axle vibrations of each axle are isolated from its mate and from the vehicle structure.

Another principal object of this invention is to provide a controlled pivotal connection between the helical coils center of a torsion spring and a vehicle structure, which will preserve relative pivotal alignment therebetween when said torsion spring coils are unwound as when unstressed, and when wound as under torsional stress.

Another principal object of this invention is to provide a more simple construction whereby weight and cost may be reduced in tandem axle suspensions for trucks, trailers and rail vehicles and for aircraft landing gear, by means of helically wound metallic torsion springs, pivotally attached to a vehicle structure at the helical coil center of the spring, and with oppositely extending spring ends adjustably secured directly to trnasverse sides of supporting axles disposed longitudinally beyond the helical coil center of the torsion spring.

Another object of this invention is to reduce the weight of tandem axle vehicle suspensions by means of helically wound torsionally stressed springs constructed of tubular, rather than solid bar spring stock.

A further object of this invention is to provide a low frequency of soft ride suspension in a tandem axle bogie approximating that presently obtainable only through use of tubular elastomers stressed in torsional shear and bondedly attached to metallic sleeves which are in turn secured to separate arms extending to the supporting axles. Such constructions are portrayed in my United States Letters Patents 2,951,710, 3,013,808 and 3,171,-668.

A further object of this invention is to provide a helical torsion form of articulated, torque reactive suspension beam for interconnection between the adjacent ends of longitudinally disposed leaf spring secured to tandem axles of vehicle structures operable on rail, track or roadway.

A still further object of this invention is to employ helical coil torsion springs to isolate a vehicle structure from axle excitations and road shocks transmitted by a leaf spring secured to such axle.

A further object of this invention is to isolate a vehicle structure and each opposing axle of a tandem axle suspension, from axle excitations by means of structure mounted equalizing helical torsion springs, torque reactive on the adjacent ends of axle mounted leaf springs of the suspension.

Experience has shown that helical springs should be wound so that the coils will tighten or wind up as the spring is torsionally stressed, thus clearance within the inside diameter of the helical coils must be provided when the spring is free or un-stressed, to allow for the reduction in diameter as load is imposed. In this invention, the practical application of hingedly attached helical torsion springs to tandem suspensions is dependent upon controlled alignment in the hinged attachment to the vehicle, of said spring and the axles attached thereto, regardless of the degree to which the springs are loaded. In this invention, such controlled alignment is provided throughout the vehicle load range by means of an elastomeric bushing sheathed within an axially split sleeve; the bushing being oversized so it must be compressively deformed when pressed (within its metallic sleeve) into the inner diameter of the helical coils when said coils are free and unstressed. As the spring is stressed torsionally the coils are wound up and their inner diameter is decreased, further deforming the encircled elastomer to tighten control of axial alignment of the springs to which the tandem axles are directly attached.

In a modified form of the invention, the use of (vehicle) structure mounted, torque reactive helical torsional springs are portrayed as replacements for the customary undamped equalizing beam which interconnect the adjacent ends of axle mounted semi-elliptical leaf springs of tandem suspensions.

Torsional deflection in the helical coils of a torsion spring here provides the effect of a pivoted equalizing beam of controlled resiliency between the vehicle structure on which it is pivotally mounted and the adjacent ends of the axle mounted leaf springs which it interconnects, to isolate the excitations of each axle from its opposing axle, and to isolate the vehicle structure from the vibrations and road shocks of both axles.

In still another modified form of the invention, one end of helical coiled torsion spring is resisted by the weight of the vehicle structure while the free end of the spring is supported on the outwardly extending end of a leaf spring attached to a supporting axle, whereby torsional deflection of the helical torsion spring isolates the road shocks and axle vibrations transmitted through said leaf spring.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view partly in section of an isolator assembly including a torque reactive articulated beam suspension for a vehicle having tandem axles, as viewed on line 1—1 of FIG. 2.

FIGURE 2 is a top plan view thereof.

FIGURE 3 is a view similar to FIG. 1 of an isolator assembly embodying a modified form of the invention supported on the ends of adjacent leaf springs.

FIGURE 4 is a fragmentary top plan view thereof.

FIGURE 5 is a fragmentary side elevational view of an isolator assembly embodying still another modified form of the invention.

Referring now in detail to the various views of the drawings, in FIGS. 1 and 2 there is shown a portion of a frame 10 of a vehicle structure in the form of a tandem bogie supported on road wheels 12 fixed on tandem cross axles 14. On both sides of the frame, a pair of brackets 16 are riveted and have tapered extensions 18 depending therebelow. A tubular suspension shaft 20 is supported between the extensions 16. An elastomer bushing 22 is shown sleeved over the shaft 20 and an axially split metal sleeve 24 is sleeved over the bushing. The segments of the sleeve 24 are slightly spaced from each other as indicated at 26 to enable deformation of the elastomer bushing therein, as the encircling helical coils of the torsion spring later to be described contract diametrically under load stress.

In accordance with the invention, a coiled torsion spring 28 encircles the split sleeve 24 and is supported between the brackets 16. The torsion spring 28 is formed of metal bar stock. The coils 30 of the spring encircle the split sleeve 24 and the elongated ends 32, 32 of the spring radiate from the body of the spring in opposite directions. The ends 32, 32 of the torsion spring are shown clamped to transverse sides of the respective cross axles 14 by U-bolt and nut assemblies including a pair of U-bolts 34, plate-like caps 36 seated on the ends and nuts 38 secured to the free ends of the legs 40 of the U-bolts. While the torsion spring 28 is shown disposed above the cross axles 14, the spring may be disposed below especially when used with truck drive axles which are normally provided with a bushed connection at a hanger bracket under the axle and a torque rod thereover to afford a parallelogram movement favorable to drive shaft alignment. And when maximum transverse stability is required, the extended end of the torsion spring may be centrally secured between separate wheels carried on stub axles projecting on each side of the torsion spring, thus increasing transverse distance between spring centers.

The attachment of the torsion spring 28 to the cross axles 14 as shown affords selective alignment of axles to the vehicle structure assuring minimum tire wear.

The bar stock of the torsion spring 28 may be round or square or any other convenient form and where lightness in weight is desired, the bar stock may be tubular in section, and of either round, square or other form.

Where steering control by the rearward axle, over an axle forward of the helical torsion spring suspension shaft 20, is desired, by increasing the distance from said suspension shaft 20 to the rearward axle, over that to forward axle, added loading of said rearward axle to provide equal ground weight at both axles, may be provided with supplemental torque or compression elements reacting between said structure and rearward axle, such novelty having been disclosed in my prior Patents 2,951,710, 3,013,808 and 3,171,668.

Referring now to FIGS. 3 and 4 wherein an isolator assembly embodying a modified form of the invention is shown, herein the invention is shown applied to a conventional trailer suspension wherein each tandem axle 14' is secured to a leaf spring 44 of semi-elliptic type, at transversely opposite sides of said axle, with the outwardly extending ends of said leaf spring supporting part of the structure weight, while the inwardly and thus adjacent ends 48 of said leaf springs are here shown supported by the oppositely extending ends 50 of a helically coiled torsion torque reactive spring 28' on the opposite leaf springs 52. The torsion spring 28' is pivoted in side brackets 16' fixed on the structure 10' and is shown encircling the split sleeve 24', which sleeve 24' is shown encircling an elastomer bushing 22' which is sleeved over the solid suspension shaft 20'. The segments of the split sleeve 24' are slightly spaced from each other as indicated at 26' to enable deformation of the elastomer bushing therein. The ends 32' of the torsion spring 28' extend oppositely and radially from its center and are provided with attachable shoes 56 of low friction material such as deldrin at their points of contact with the ends of the adjacent leaf springs 48. Downwardly extending flanges 58 are formed on the shoes for controlled alignment with the leaf springs. The flanges 58 have an equalizing and/or rebound stop 60. The rearward flanges attached to the torsion spring 28' are provided with stub stops 62 projecting inwardly to limit leaf spring movement, but do not extend entirely thereunder so that they may deflect over the rear radius rod 64 thereat.

No claim is made herein as to the well known use of leaf springs and axles, but only to the novelty of helical torsional springs and deflectable elastomer mountings whereby torsional deflection of said torque reactive spring isolates the road shocks and axle vibrations of each axle from its opposing mate, and from the vehicle structure, while also serving as an articulated, damping, equalizing beam to enable load equalization between the adjacent ends of the opposing leaf springs.

The torsion springs as here disclosed have a progressive spring rate because the lever arm contact at empty is 7.4 inches while at design load the contact is at best 2.4 inches, thus affording normal loaded deflection at but one-third load. Then at impact or bump deflection, the lever arm contact further shortens to but 2 inches while the torsion spring windup continues beyond the 30 degrees design load deflection. In present construction, an undamped beam equalizes the load and transmits the axle excitation without isolation thereof.

In FIG. 5 an isolator assembly embodying a further modified form of the invention is illustrated. In this form, a helical torsion spring 28a is interposed between the end of a leaf spring 44a and a vehicle structure 10a, but the torsion spring 28a is torque reactive on the structure, and the torsion spring windup for a given deflection at spring end 46a is but one-half the degrees as disclosed where said torsion spring 28a interconnects adjacent leaf springs 44a.

In all other respects, the isolator assembly shown in FIG. 5 is the same as the isolator assembly shown in FIG. 3 and similar reference numerals are used to indicate similar parts.

The novelty of this invention lies in the application of the helically coiled torsion springs 28, 28' and 28a as integrally articulated suspension beams, torque reactive as between tandem axles interconnected thereby and to the vehicle structure, whereby the relative spring rate per axle is but one-half that of other suspension constructions for a given static and dynamic frame deflection, as a result of the torque reactive feature, which enables one axle to deflect vertically under a given load or road shock $2x$ the deflection of both axles, and without the use of mechanically hinged or articulated suspension beams.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. The combination in a tandem axle suspension system for vehicles, of
   (a) a frame structure;
   (b) a suspension bracket connected to each side of said structure;
   (c) a suspension shaft in said bracket;
   (d) a tubular elastomer bushing on said shaft;
   (e) a split sleeve surounding said bushing;
   (f) a helical torsion spring having opposite extending ends surrounding said sleeve;
   (g) longitudinally disposed tandem axles spaced apart from said suspension brackets;
   (h) the opposite extending ends of said spring secured to said axles whereby the load resistance of said torsional spring will be equally torque reactive on both axles.

2. The combination as set forth in claim 1 wherein the helical coil spring is formed of tubular section spring metal stock.

References Cited

UNITED STATES PATENTS

| | | | |
|---|---|---|---|
| 1,338,557 | 4/1920 | Crawford | 267—27 |
| 2,109,311 | 2/1938 | Dayton | 267—58 |
| 2,923,961 | 2/1960 | Black | 267—58 |

BENJAMIN HERSH, *Primary Examiner.*

P. GOODMAN, *Assistant Examiner.*